(No Model.)
B. RAHMER.
COMBINED CANE AND CAMERA TRIPOD.
No. 513,058. Patented Jan. 16, 1894.
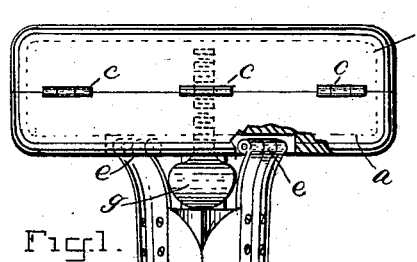
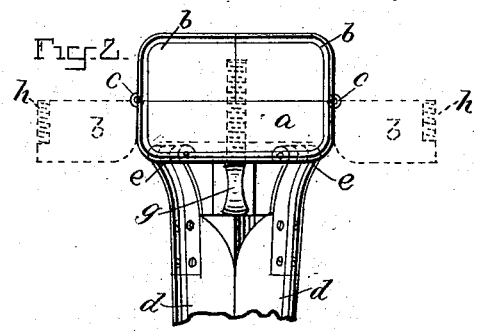
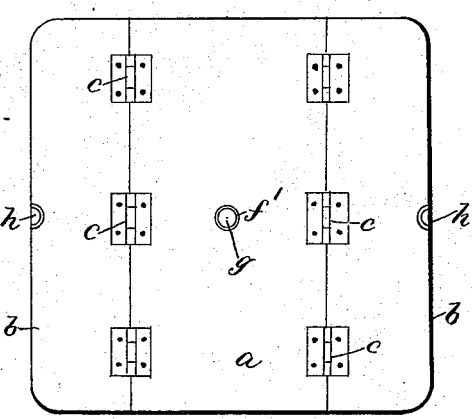
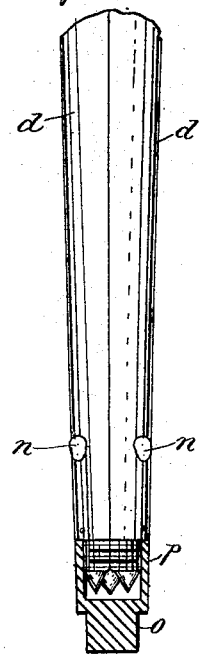
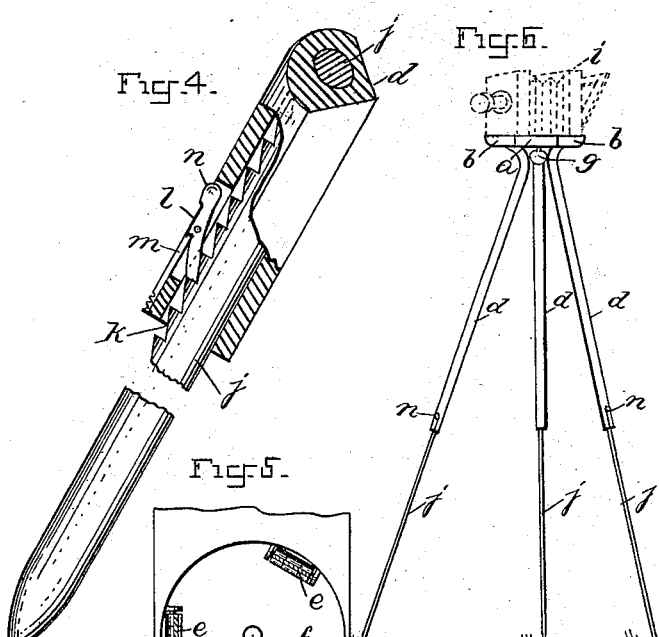
WITNESSES.
INVENTOR.
THE NATIONAL LITHOGRAPHING COMPANY,
WASHINGTON, D. C.

UNITED STATES PATENT OFFICE.

BESSIE RAHMER, OF NEW YORK, N. Y.

COMBINED CANE AND CAMERA-TRIPOD.

SPECIFICATION forming part of Letters Patent No. 513,058, dated January 16, 1894.

Application filed April 25, 1893. Serial No. 471,761. (No model.)

*To all whom it may concern:*

Be it known that I, BESSIE RAHMER, a citizen of the United States, and a resident of New York city, in the county and State of New York, have invented new and useful Improvements in a Combined Cane and Camera-Tripod, of which the following is a specification.

My invention consists of a T-headed cane the staff of which is composed of three laterally spreading extensible legs, and the head is a folding device adapted to open and serve for the table on which the camera may rest, with a ferrule tip to secure the lower ends of the members of the staff in the condition for the cane whereby the stand which is ordinarily an inconvenient bundle to carry is converted into a desirable and useful walking stick, as hereinafter fully described, reference being made to the accompanying drawings in which—

Figure 1, is a side elevation of the apparatus in the conditions of the cane, with some parts in section. Fig. 2, is an elevation of the upper part of the apparatus in the same conditions, in a view at right angles to that of Fig. 1, and with dotted lines indicating the head unfolded as when serving for the camera stand. Fig. 3, is a top view of the unfolded head adapted for the table of the stand. Fig. 4, is an elevation of part of one of the extensible legs on an enlarged scale with some parts in section. Fig. 5, is a top view of the staff with the head removed, and Fig. 6, is an elevation of the stand as in use with a camera thereon in dotted lines, and on a reduced scale.

I provide a T-head for the cane and a table for the camera consisting of the center piece $a$, of suitable length, width and thickness for the lower half of a cane handle, and the two other pieces $b$, of equal length and thickness, but half the width and hinge the said pieces $b$ at one edge to the outer upper edges of the piece $a$, as shown at $c$, and to the lower side of the piece $a$, I connect three equal longitudinal sections $d$, of the cane staff and camera legs by hinges $e$, suitable for allowing the said members or legs to spread equilaterally as the legs of a tripod, preferably employing a metallic disk as $f$, as the means of making the connection of the hinges with the piece $a$, the said hinge joints being made with the edge of the disk, and preferably also fitting the disk in a recess of sufficient depth in the piece $a$, to conceal the hinge joints from view, and through a hole $f'$ in the center of the piece $a$, I insert a thumb-screw $g$, to secure the pieces $b$, when folded on piece $a$, by screwing into the threaded socket formed of the half parts $h$, thereof in the edge of each piece $b$, respectively so as to coincide when said pieces are folded. The said thumb-screw also serves to secure the camera on the table by screwing into a socket in the bottom of the camera case as indicated in Fig. 6; other means of securing the head and securing the camera on the table may be employed. The sections $d$, of the cane staff or camera legs are bored longitudinally and have other extensible sections $j$, fitted in them telescopically in which, for some distance along the upper portion, are ratchet notches $k$, wherein pawls $l$ pivoted in the slotted lower portions of the sections $d$, engage to hold the extended sections when adjusted for the camera stand, said pawls each having a spring $m$, to hold them in such engagement while so required, and said pawls have a thumb-bit $n$, suitably accessible in the slot for detaching them from the ratchet notches when the stand is to be converted into the cane. The series of notches in each section $g$, facilitate setting the table level on uneven ground.

The sections $d$ of the cane staff are collectively threaded at the lower end, and a wearing tip $o$, having an internally screw threaded socket $p$, is screwed on to secure the parts in the condition for a cane.

I claim—

1. The combined cane and camera stand consisting of the folding cane head and camera supporting table, the staff composed of laterally spreading and extensible legs separately jointed to the T-head, and the socket tip confining the parts of the staff in the conditions for the cane substantially as described.

2. The combined cane and camera stand consisting of the folding cane head composed of the middle lower piece and two upper pieces hinged thereto, the staff composed of three laterally spreading and extensible legs separately jointed to the metallic disk fitted in the recess of the said middle piece of the head, and the socket tip confining the parts of the staff in the condition for the cane substantially as described.

3. The combined cane and camera stand consisting of the folding cane head and camera supporting table, the staff composed of the laterally spreading and extensible legs separately jointed to the head, the thumb-screw for securing the head and securing the camera to the table, and the socket tip confining the parts of the staff in the condition for the cane substantially as described.

In testimony that I claim the foregoing as my invention I have signed my name, in presence of two witnesses, this 17th day of March, 1893.

BESSIE RAHMER.

Witnesses:
W. J. MORGAN,
A. P. THAYER.